United States Patent
Vargas Vasquez

(10) Patent No.: US 11,662,091 B2
(45) Date of Patent: May 30, 2023

(54) DEVICE TO FACILITATE AND MAINTAIN A FIRE

(71) Applicant: Armando Vargas Vasquez, Coahuila (MX)

(72) Inventor: Armando Vargas Vasquez, Coahuila (MX)

( * ) Notice: Subject to any disclaimer, the term of this patent is extended or adjusted under 35 U.S.C. 154(b) by 404 days.

(21) Appl. No.: 17/071,052

(22) Filed: Oct. 15, 2020

(65) Prior Publication Data
US 2022/0120436 A1    Apr. 21, 2022

(51) Int. Cl.
*F23B 60/02* (2006.01)
*F23H 7/02* (2006.01)

(52) U.S. Cl.
CPC ............... *F23B 60/02* (2013.01); *F23H 7/02* (2013.01)

(58) Field of Classification Search
CPC ......... A47J 37/0786; F23L 1/00; F23B 60/02; F23H 7/02
See application file for complete search history.

(56) References Cited

U.S. PATENT DOCUMENTS

| | | | | |
|---|---|---|---|---|
| 649,528 A | * | 5/1900 | Pierce | F23K 3/14 110/118 |
| 5,197,455 A | * | 3/1993 | Tessien | A47J 37/079 126/144 |
| 2008/0230044 A1 | * | 9/2008 | Warner | F24B 1/182 126/25 B |
| 2012/0192852 A1 | * | 8/2012 | Whitmire | F24B 15/005 126/25 B |
| 2015/0289717 A1 | * | 10/2015 | Haski | A47J 37/079 126/25 B |
| 2020/0129008 A1 | * | 4/2020 | Loethen | A47J 37/079 |

* cited by examiner

*Primary Examiner* — Alfred Basichas
(74) *Attorney, Agent, or Firm* — Albert Bordas, P.A.

(57) ABSTRACT

A device to facilitate and maintain a fire, having a camera assembly with a base, an apex, lateral columns, a first ring, and a second ring; and an air intake channel connected to the camera assembly. The first and second rings are intercepted by the lateral columns to define a plurality of apertures. The camera assembly defines a cavity area. The cutouts are positioned around the base separated a predetermined distance from each other, and extend from the base bottom edge without reaching the base top edge. The main opening extends from the base bottom edge towards the base top edge. The main opening defines a semi-circle. The plurality of apertures defined at the camera assembly and air intake through the air intake channel provide a sufficient amount of oxygen so that a fire is maintained until matter upon the camera assembly is consumed without suffocating and become extinguished.

10 Claims, 4 Drawing Sheets

DEVICE TO FACILITATE AND MAINTAIN A FIRE

BACKGROUND OF THE INVENTION

1. Field of the Invention

The present invention relates to fire starting devices, and more particularly, to devices to start and maintain a fire.

2. Description of the Related Art

Applicant is not aware of any devices to facilitate and maintain a fire having the novel features of the present invention.

SUMMARY OF THE INVENTION

The present invention is a device to facilitate and maintain a fire, comprising a camera assembly having a base, an apex, lateral columns, a first ring, and a second ring; and an air intake channel connected to the camera assembly.

The base comprises a base bottom edge, a base top edge, a plurality of cutouts, and a main opening. In a preferred embodiment, the base is circular. The lateral columns extend from the base top edge to the apex defining a predetermined angle. The camera assembly forms a conical shape. The first ring comprises a first predetermined diameter and the second ring comprises a second predetermined diameter, wherein the first predetermined diameter is smaller than the second predetermined diameter. The first and second rings are positioned between the apex and the base and are separated a predetermined distance from each other. The first ring is positioned closer to the apex than the second ring, and the second ring is positioned closer to the base than the first ring, defining the conical shape. The first and second rings are intercepted by the lateral columns to define a plurality of apertures. The camera assembly defines a cavity area. The cutouts are positioned around the base separated a predetermined distance from each other, and extend from the base bottom edge without reaching the base top edge. The main opening extends from the base bottom edge towards the base top edge. The main opening defines a semi-circle.

The air intake channel comprises a channel wall, an external end, an internal end, a first lateral edge, and a second lateral edge. The channel wall has curvature to form a general semi-circular shape. The first lateral edge and the second lateral edge are on a same plane as the base bottom edge. The external end comprises a first predetermined radius and the internal end comprises a second predetermined radius, wherein the first predetermined radius is larger than the second predetermined radius. The air intake channel is connected to the base, whereby the internal end is attached around the main opening. The air intake channel is free from obstruction and functions as a conduit to provide for oxygen to enter an inside of the camera assembly. The plurality of apertures defined at the camera assembly and air intake through the air intake channel provide a sufficient amount of oxygen so that a fire is maintained until matter upon the camera assembly is consumed without suffocating and become extinguished.

It is therefore one of the main objects of the present invention to provide a device to start, facilitate, and maintain a fire.

It is another object of this invention to provide a device to start, facilitate, and maintain a fire having a camera assembly and an air intake channel.

It is another object of this invention to provide a device to start, facilitate, and maintain a fire in a controlled outdoor/indoor fire setting.

It is another object of this invention to provide a device to start, facilitate, and maintain a fire that is volumetrically efficient for carrying, transporting, and storage.

It is another object of this invention to provide a device to start, facilitate, and maintain a fire, which is of a durable and reliable construction.

It is yet another object of this invention to provide a device to start, facilitate, and maintain a fire that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
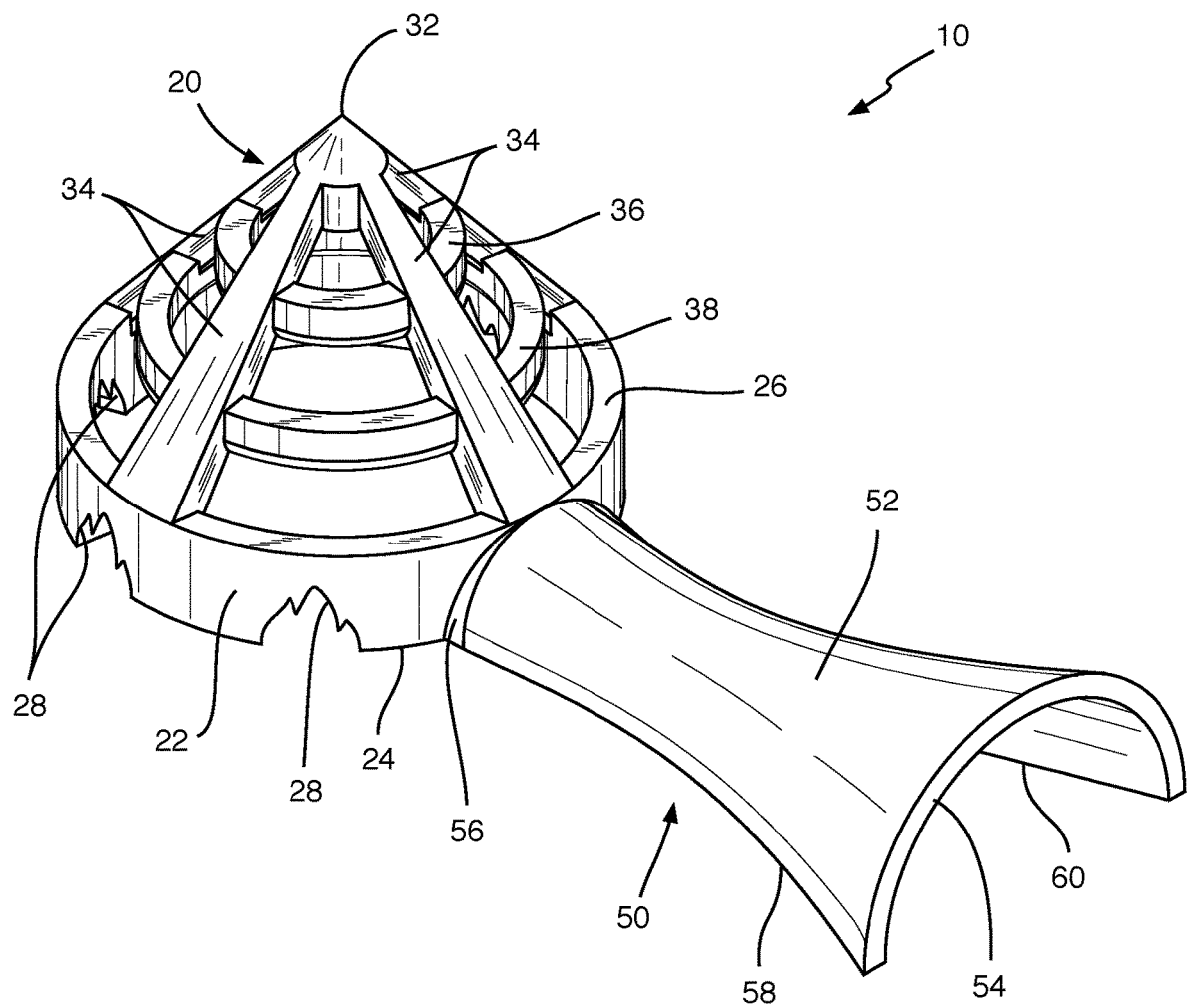
FIG. 1 is an isometric view of the present invention.

Referring now to the drawings, the present invention is a device to start, facilitate, and maintain a fire, and is generally referred to with numeral 10. It can be observed that it basically includes camera assembly 20 and air intake channel 50.

As seen in FIG. 1, camera assembly 20 and air intake channel 50 connect. Camera assembly 20 comprises base 22, apex 32, lateral columns 34, first ring 36, and second ring 38. In a preferred embodiment, base 22 is circular. In a preferred embodiment, camera assembly 20 is conical in shape. First ring 36 is positioned closer to apex 32 than second ring 38, and second ring 38 is positioned closer to base 22 than first ring 36, defining the conical shape. Camera assembly 20 defines a cavity area within the conical shape. Air intake channel 50 comprises channel wall 52, external end 54, internal end 56, first lateral edge 58, and second lateral edge 60. Channel wall 52 has curvature to form a general semi-circular shape, whereby external end 54 forms a first predetermined radius and internal end 56 forms a second predetermined radius. The first predetermined radius is larger than the second predetermined radius.

Figure 2:
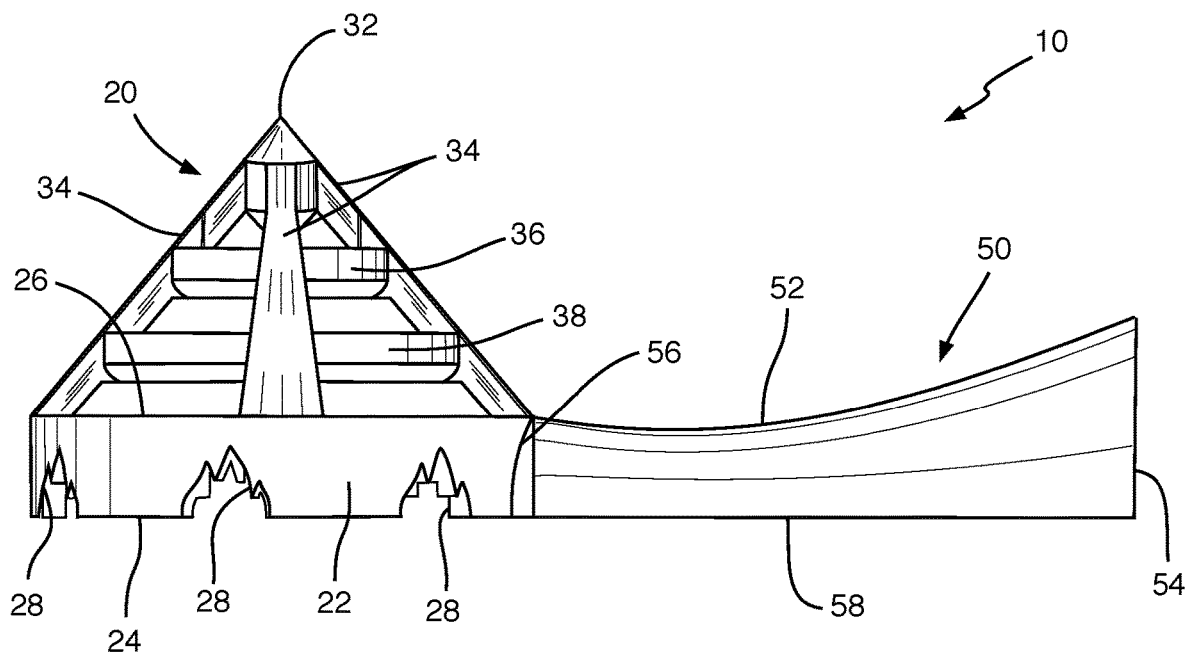
FIG. 2 is a side view of the present invention.
Figure 3:
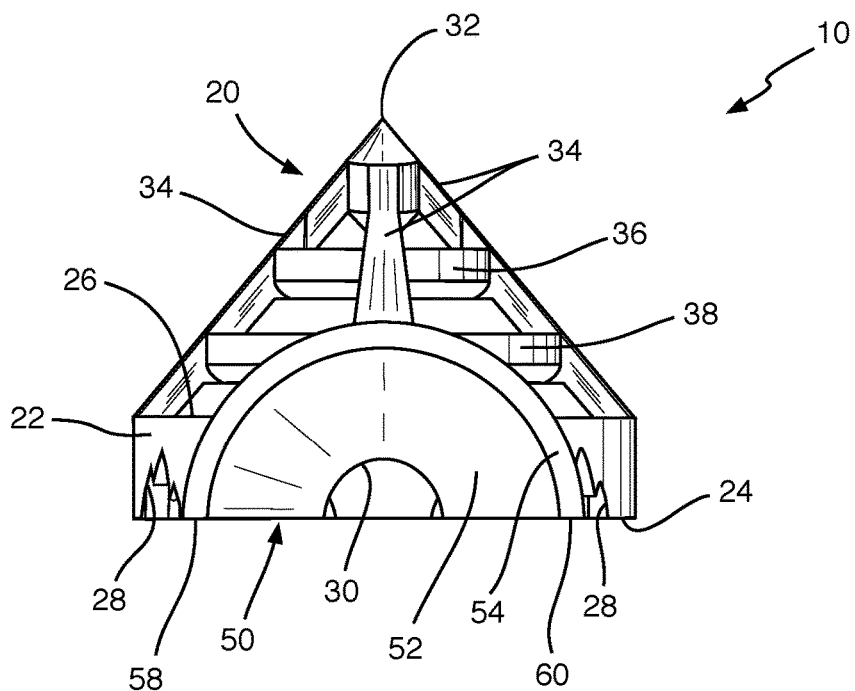
FIG. 3 is a front view of the present invention showing an air intake channel connecting to an opening of a camera assembly.

As seen in FIGS. 2 and 3, base 22 comprises base bottom edge 24, base top edge 26, a plurality of cutouts 28, and main opening 30. Lateral columns 34 extend from base top edge 26 to apex 32 defining a predetermined angle. Cutouts 28 are separated at predetermined distances around base 22. Cutouts 28 extend from base bottom edge 24 without reaching base top edge 26 and have an irregular shape(s). Main opening 30 extends from base bottom edge 24 towards base top edge 26. Main opening 30 defines a semi-circle. Air intake channel 50 connects to base 22, whereby internal end 56 is attached around main opening 30. Air intake channel 50 allows for oxygen to enter within camera assembly 20. First lateral edge 58 and second lateral edge 60 are on a same plane as base bottom edge 24.

Figure 4:
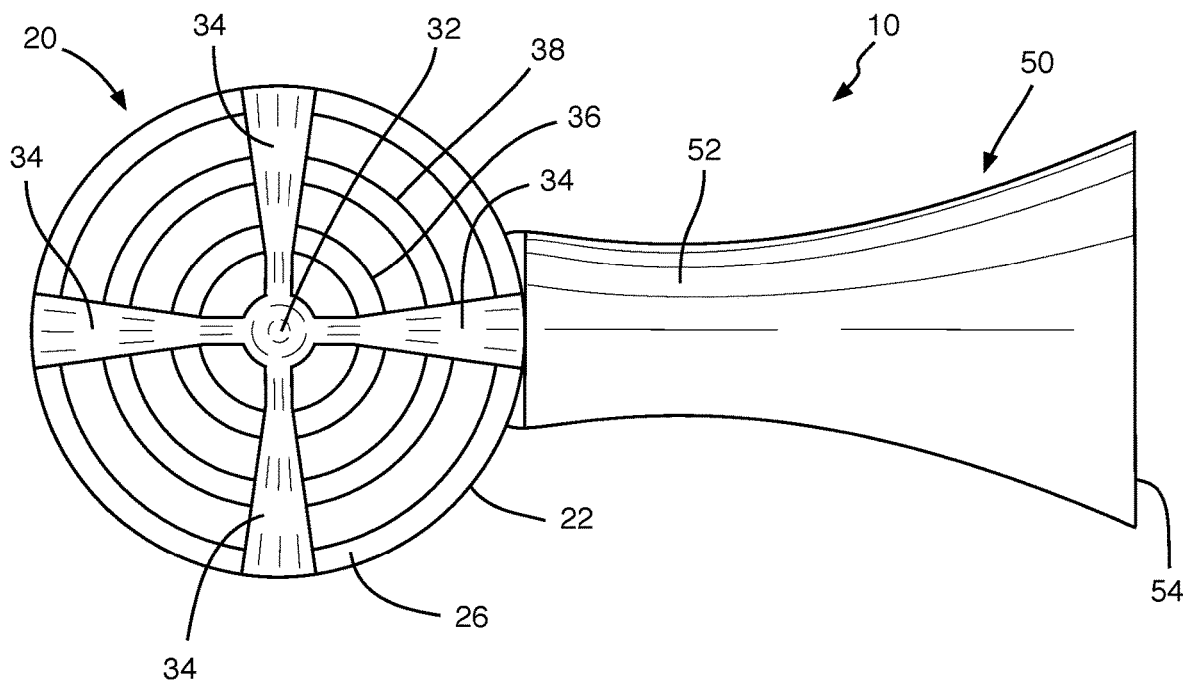
FIG. 4 is a top view of the present invention.
Figure 5:
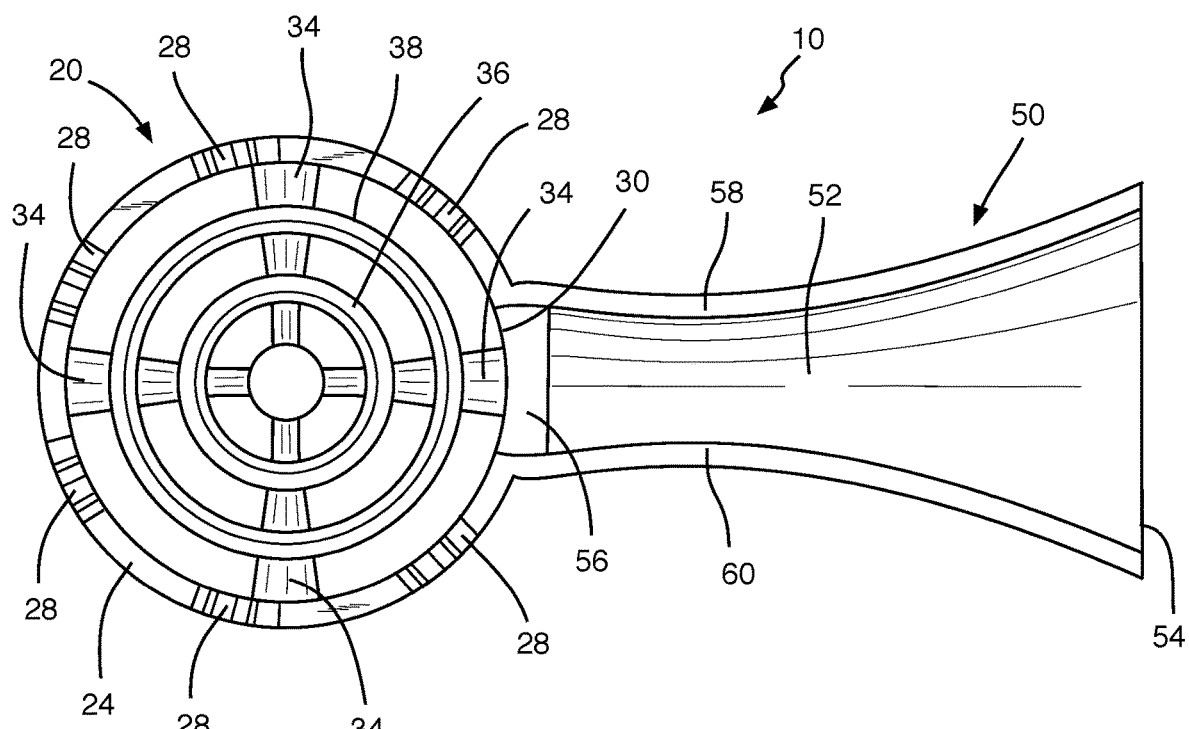
FIG. 5 is a bottom view of the present invention.

As seen in FIGS. 4 and 5, first ring 36 comprises a first predetermined diameter and second ring 38 comprises a second predetermined diameter, and the first predetermined diameter is smaller than the second predetermined diameter. First and second rings 36 and 38 respectively are positioned between base 22 and apex 32, and are separated a predetermined distance. First ring 36 and second ring 38 are intercepted by lateral columns 34 to define a plurality of apertures.

Figure 6:
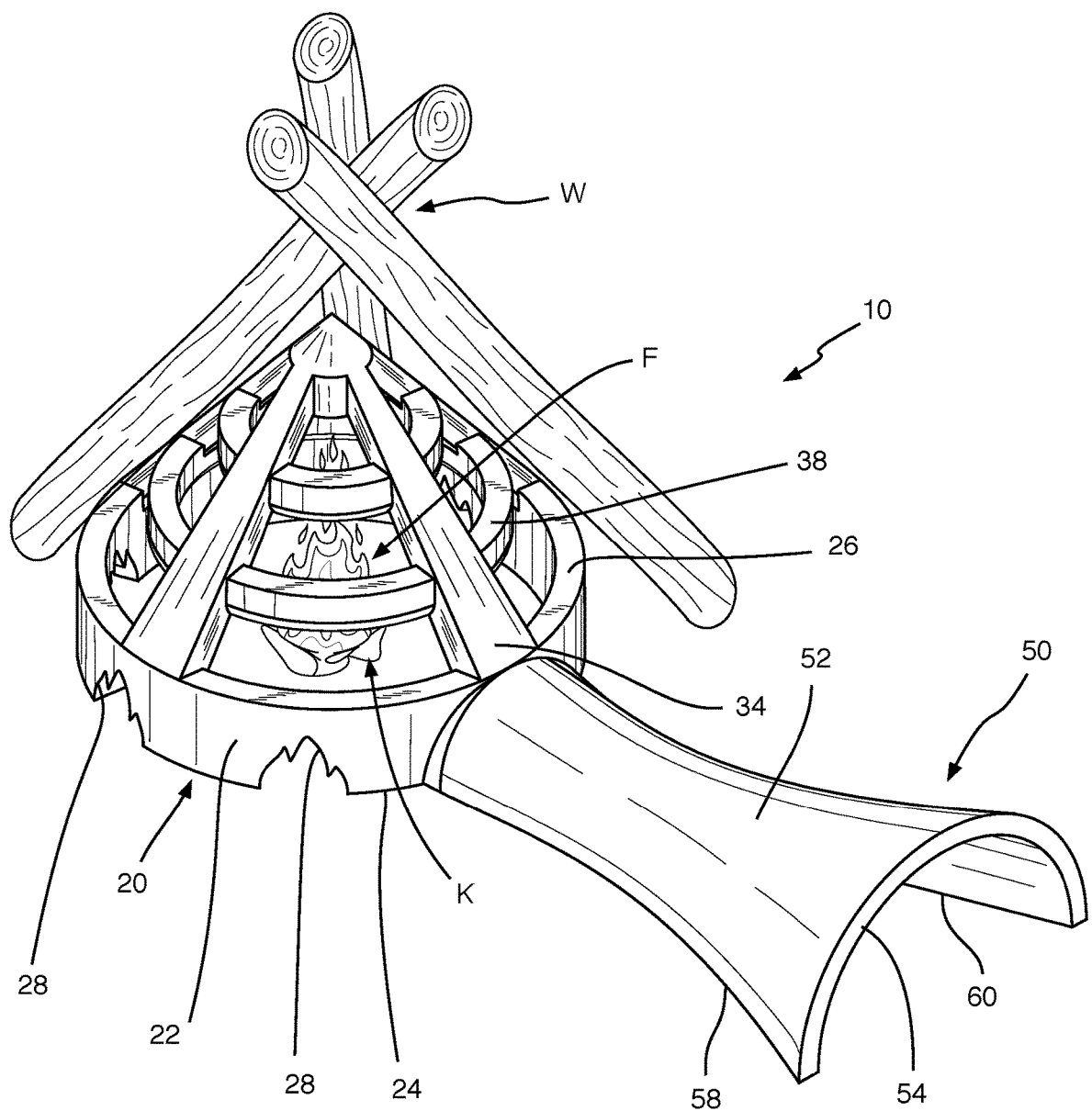
FIG. 6 is an isometric view of the present invention in use.

As seen in FIG. 6, present invention 10 is used to start and keep fire F lit while in a controlled outdoor/indoor setting such as a campfire, bonfire, and/or fireplace.

In operation, a piece of kindling K and/or tinder bundle is/are placed onto the ground at an angle within camera assembly 20 and without obstructing air intake channel 50. Kindling K and/or tinder bundle is lit with a fire source such as a lighter, torch, or matches, not seen, to create fire F. Air intake channel 50 is free from obstruction and functions as a conduit to provide for oxygen to enter an inside of camera assembly 20. Wood W and/or other matter that heats up and/or burns, is placed onto camera assembly 20. The other matter may be, but is not limited to, fire wood, fire logs, charcoal or any other compatible matter that heats up and/or burns.

Present invention 10 also allows for easy and convenient fire lighting to cook with wood W, and/or the fire wood, fire logs, charcoal or any other compatible matter that heats up and/or burns. The plurality of apertures defined at camera assembly 20 and the air intake through air intake channel 50 provide a sufficient amount of oxygen so that fire F is maintained until wood W is completely consumed without suffocating and become extinguished.

Present invention 10 is reusable and made of heat/fire resistant materials. In a preferred embodiment, present invention 10 is made of iron.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device to facilitate and maintain a fire, comprising:
A) a camera assembly having a base, an apex, lateral columns, a first ring, and a second ring, said base comprising a base bottom edge, a base top edge, a plurality of cutouts, and a main opening, said lateral columns extending from said base top edge to said apex defining a predetermined angle, said camera assembly forming a conical shape, said first and second rings are intercepted by said lateral columns to define a plurality of apertures, said main opening extending from said base bottom edge towards said base top edge, said main opening defining a semi-circle; and
B) an air intake channel connected to said camera assembly, said air intake channel comprising a channel wall, an external end, an internal end, a first lateral edge, and a second lateral edge, said channel wall has curvature to form a general semi-circular shape, said external end comprises a first predetermined radius and said internal end comprises a second predetermined radius, wherein said first predetermined radius is larger than said second predetermined radius, said air intake channel is connected to said base, whereby said internal end is attached around said main opening.

2. The device to facilitate and maintain a fire set forth in claim 1, further characterized in that said base is circular.

3. The device to facilitate and maintain a fire set forth in claim 1, further characterized in that said first ring comprises a first predetermined diameter and said second ring comprises a second predetermined diameter, wherein said first predetermined diameter is smaller than said second predetermined diameter.

4. The device to facilitate and maintain a fire set forth in claim 1, further characterized in that said first and second rings are positioned between said apex and said base and are separated a predetermined distance from each other.

5. The device to facilitate and maintain a fire set forth in claim 1, further characterized in that said first ring is positioned closer to said apex than said second ring, and said second ring is positioned closer to said base than said first ring, defining said conical shape.

6. The device to facilitate and maintain a fire set forth in claim 1, further characterized in that said camera assembly defines a cavity area.

7. The device to facilitate and maintain a fire set forth in claim 1, further characterized in that said cutouts are positioned around said base separated a predetermined distance from each other, and extend from said base bottom edge without reaching said base top edge.

8. The device to facilitate and maintain a fire set forth in claim 1, further characterized in that said first lateral edge and said second lateral edge are on a same plane as said base bottom edge.

9. The device to facilitate and maintain a fire set forth in claim 1, further characterized in that said air intake channel is free from obstruction and functions as a conduit to provide for oxygen to enter an inside of said camera assembly.

10. The device to facilitate and maintain a fire set forth in claim 1, further characterized in that said plurality of apertures defined at said camera assembly and air intake through said air intake channel provide a sufficient amount of oxygen so that a fire is maintained until matter upon said camera assembly is consumed without suffocating and become extinguished.

* * * * *